United States Patent [19]

Tsengas

[11] Patent Number: 5,160,257
[45] Date of Patent: Nov. 3, 1992

[54] FISHING EQUIPMENT ANCHOR

[76] Inventor: Steven Tsengas, 7768 Litchfield Dr., Mentor, Ohio 44060

[21] Appl. No.: 689,153

[22] Filed: Apr. 22, 1991

[51] Int. Cl.⁵ ............................................. A01K 97/16
[52] U.S. Cl. ............................................ 43/25; 43/22
[58] Field of Search ........................... 43/22, 21.2, 25

[56] References Cited

U.S. PATENT DOCUMENTS

| | | | |
|---|---|---|---|
| 2,423,933 | 7/1947 | Gosh | 43/21.2 |
| 2,443,946 | 6/1948 | Bozorth | 43/25 |
| 3,010,242 | 11/1961 | Emanuel | 43/22 |
| 3,154,274 | 10/1964 | Hillcourt . | |
| 3,511,106 | 5/1970 | Deeby . | |
| 3,964,706 | 6/1976 | Adams . | |
| 4,412,316 | 3/1979 | Greer et al. . | |
| 4,614,323 | 9/1986 | Bauer . | |

*Primary Examiner*—Kurt C. Rowan
*Attorney, Agent, or Firm*—Watts, Hoffmann, Fisher & Heinke

[57] ABSTRACT

A fishing rod and reel assembly having an anchor for securing the assembly against loss. The anchor comprises an anchor body attached to the rod and reel and connecting structure detachably connected to the body. The body comprises a body portion extending between the reel and the rod, body portion movement limiting structure for engaging the rod and reel to prevent separation of the anchor body from the assembly, and end structure detachably connected to the conecting structure. The connecting structure comprises a tether having quick disconnecting spring-clip connectors at its ends.

8 Claims, 3 Drawing Sheets

FISHING EQUIPMENT ANCHOR

BACKGROUND OF THE INVENTION

1. Field of the Invention

This invention relates to anchors for preventing the loss of fishing equipment and more particularly to rod and reel assemblies having loss preventative anchors.

2. Description of the Related Art

Loss of rod and reel assemblies in the water is a common problem among fishing enthusiasts. Normally, rod and reel assemblies do not float so the equipment may be lost when wind, waves, or other forces knock a rod and reel assembly into the water. Also, the rod and reel may be pulled into the water by the caught fish, snags, or by passing birds that get caught in the line. Some prior art proposals for solving the problem exist, but each has disadvantages.

The most practicable proposals have employed tethers for the rod and reel assemblies. Tether arrangements were typically designed so one end of the tether was fixed to a person, boat, or a stationary object and the opposite end was attached to the rod and reel assembly. These arrangements tended to unduly interfere with the fishing line and/or the reel.

In one prior art proposal, one end of the tether was formed by a snap connector detachably connected to the rod and reel assembly. See U.S. Pat. No. 3,154,274. The snap connector was connected to any available structure on the rod and reel assembly, typically a part on the reel itself, and the opposite end was secured to a boat. Because the typical reel is not designed to be tethered, such tethers often severely restricted free use of the rod and reel and interfered with the fishing line or the reel while catching fish.

Another prior art proposal employed a cord-like tether formed into a slip knot tied to the rod and reel assembly. See U.S. Pat. No. 4,142,316. The slip knot method of connecting the tether line created a possibility of interference with the fishing line or the reel and the knotted tether was not easily removable.

The present invention provides a new and useful loss preventive anchor for overcoming the above disadvantages and securing the fishing equipment against loss.

SUMMARY OF THE INVENTION

In a preferred and illustrated embodiment of the invention, a new and improved loss preventive anchor is associated with a fishing rod and reel assembly. The rod and reel are detachably secured together to form the assembly. The loss preventive anchor comprises a body secured to the rod and reel assembly and a connecting structure for anchoring the body. The body comprises a body portion disposed between the rod and reel. The connecting structure is connected to the body to prevent loss of the rod and reel assembly.

A preferred loss preventive anchor body comprises movement limiting structure for maintaining the body portion positioned between a reel mounting shoe of the reel and the mounting location of the rod. The movement limiting structure comprises first and second abutments projecting from the body and disposed for engagement with respective portions of the rod and reel.

In a preferred and illustrated embodiment the pole comprises a reel mounting location and the reel comprises a mounting shoe detachably secured to the mounting location. The anchor body portion is clamped between the reel mounting location and the mounting shoe to secure the anchor to the rod and reel assembly. The connecting structure may be formed by a tether secured to the body portion.

A preferred anchor body portion is so constructed and arranged that it creates a resilient reaction force between the rod and reel which tends to maintain the rod and reel assembled. The body portion is resiliently compressed between the rod and reel when they are clamped together. This force resiliently urges the rod and reel apart which prevents or retards self-loosening of the clamp mechanism which might otherwise occur due to rough handling or vibrations.

DESCRIPTION OF THE PREFERRED EMBODIMENT

Figure 1:
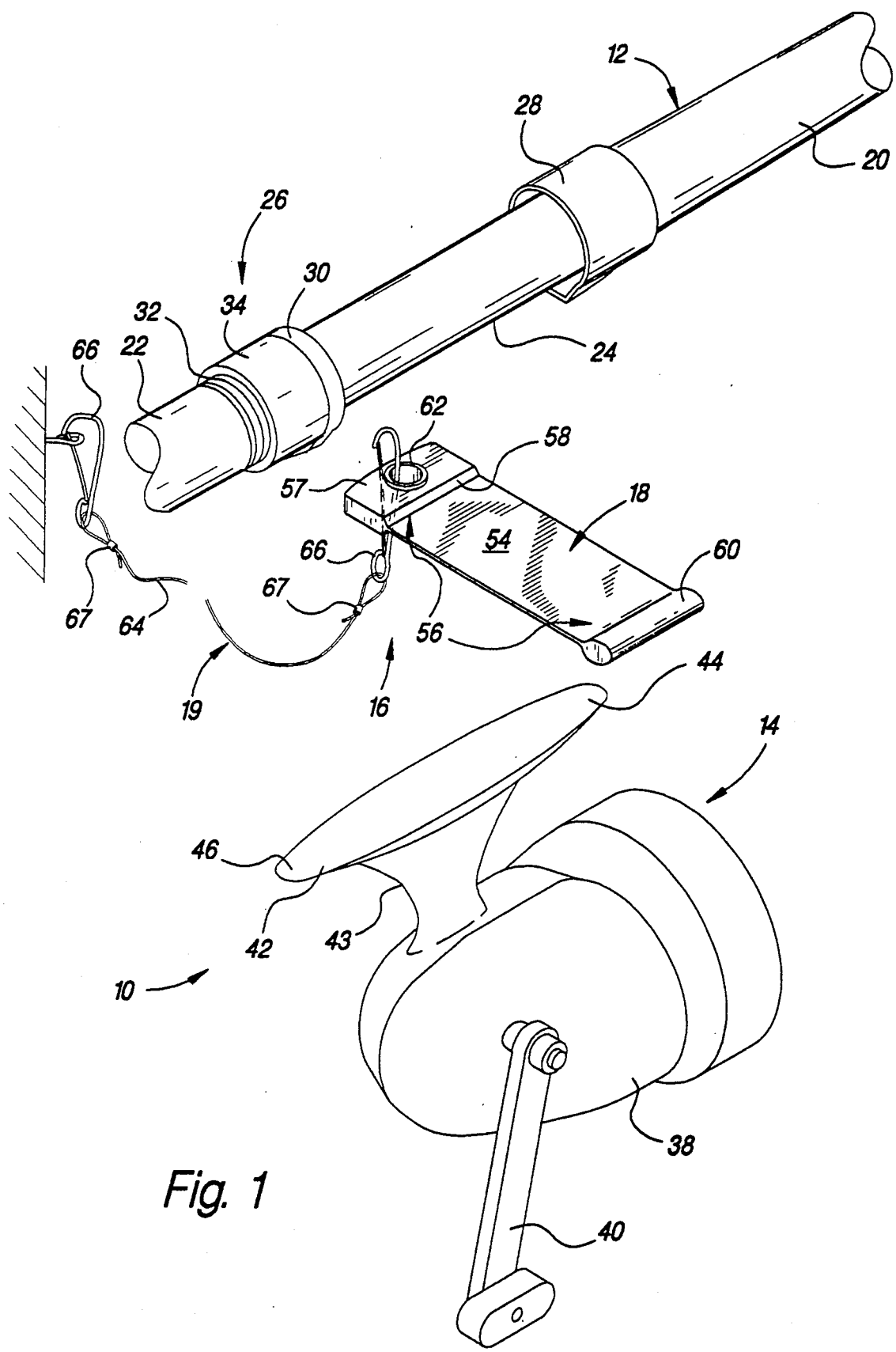
FIG. 1 is an exploded perspective view of part of a fishing rod and reel assembly and an anchor constructed in accordance with a preferred embodiment of the present invention.

A rod and reel assembly 10 constructed in accordance with the present invention is illustrated in FIG. 1 as comprising a fishing rod 12, a reel 14 constructed for assembly to the rod 12 and a loss preventive anchor arrangement 16. The anchor 16 detachably secures the assembly 10 against loss and comprises an anchor body 18 extending between the reel 14 and the rod 12 and a connecting structure 19 for securing the anchor to a boat, person or other substantial object.

The fishing rod 12 may be of any suitable or conventional construction and as illustrated includes a resiliently flexible pole 20 supported by a manually grippable handle 22. The pole 20 has conventional guides (not shown) for guiding the fishing line. The handle 22 defines a reel mounting location 24 and comprises a clamp mechanism 26 for detachably securing the reel 14 to the mounting location 24.

The illustrated clamp 26 comprises a fixed jaw 28, a movable jaw 30, and a jaw driving mechanism for shifting the jaw 30 relative to the jaw 28 to clamp and declamp the reel 14. The jaw driving mechanism comprises a threaded base 32 fixed to the handle 22, and a collar 34 threaded onto the base. The threaded collar 34 surrounds the handle 22 and moves longitudinally along the base 32 when rotated.

The reel 14 may be of any conventional construction and is schematically illustrated as comprising a gear housing 38, a manually operated crank 40, and a mounting shoe 42 connected to the housing 38 by a strut 43. The reel 14 may be of the open face, closed face or spinning type, for example, and is not described in detail.

The mounting shoe 42 is seated on the mounting location 24 and clamped by the jaws 28, 30 to support the reel 14. The shoe extends in opposite directions from its juncture with the strut 43 to define narrow relatively thin projecting opposite end regions 44,46. Each end region is tapered so that each end is progressively thinner proceeding away from the strut. The ends 44,46 are engaged by the jaws 28,30, respectively. As the jaws 28,30 clamp the shoe 42 they react against the tapered shoe ends so that the shoe 42 is urged toward the reel mounting location 24 with a wedging action.

The loss preventive anchor 16 secures the rod and reel assembly against loss when the body 18 is positioned between the rod and reel and the connecting structure 19 is attached to a person, boat or stationary object. The body 18 is illustrated in FIG. 1 as an elongated generally rectangular strip of stiffly resilient plastic or rubber-like material disposed between the rod 12 and the reel 14 at the mounting location 24. The body 18 comprises a central sheet-like body portion 54, movement limiting structure 56 for restricting relative movement between the body portion 54 and the rod and reel assembly, and end structure 57 by which the connecting structure 19 is secured to the body 18.

Figure 2:
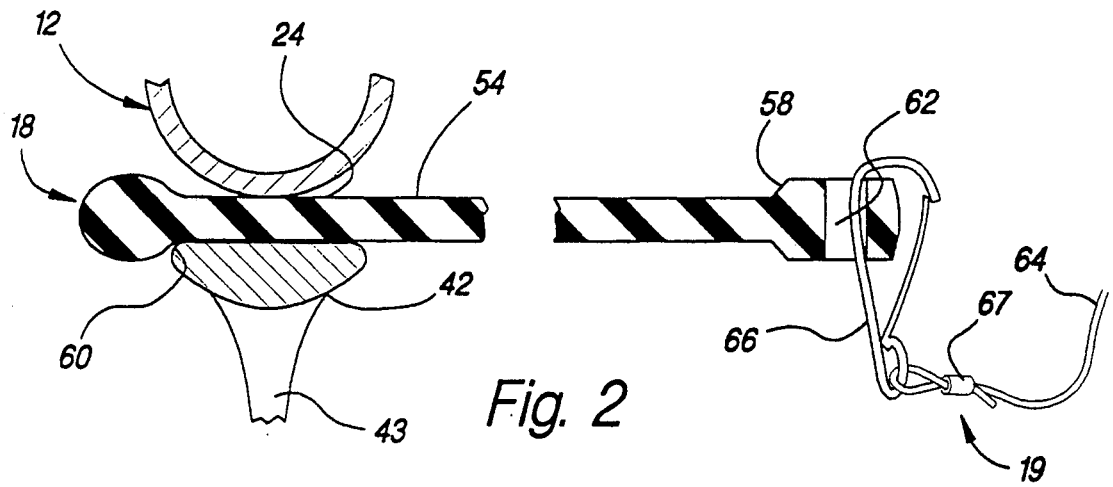
FIG. 2 is a fragmentary cross sectional view of a rod and reel assembled with an anchor constructed in accordance with FIG. 1.

The body portion 54 is relatively thin but sized to be sufficiently thick that in at least some installations it is engaged by the rod and reel and frictionally maintained between them. The body 18 illustrated by FIGS. 1 and 2 is disclosed as clamped between the rod and reel so the body portion is resiliently compressed. This resilient compression creates a reaction force which maintains the shoe 42 firmly engaged with the jaws 28,30. This reactive engagement, in turn, reduces the possibility of the jaws working loose as a result of vibrations and shocks encountered during normal use or handling of the rod and reel assembly. The body 18, when resiliently deflected by clamping it between the rod and the reel, thus serves to reduce the likelihood that the reel may be unexpectedly detached from the rod.

The body portion 54 is sufficiently thin that, depending on the rod and reel construction, it may only be lightly clamped by the assembly or, in some cases, not clamped at all. Regardless of the degree of body portion clamping, or lack of clamping, the body 18 is constructed and arranged so that the movement limiting structure assures that the body is not dislodged from the assembly.

The movement limiting structure 56 comprises first and second abutments 58, 60 disposed at opposite respective end regions of the body 18. The abutments are constructed so that one of them engages the rod and/or the reel shoe 42 whenever the body portion 54 shifts to a position from which it would otherwise fall, or be pulled, from between the rod and reel.

Referring to FIGS. 1 and 2 the abutment 58 is formed by a generally cylindrically shaped, enlarged body end region which is continuous with the body portion 54. The diametral size of the abutment 58 is substantially greater than the body portion thickness and the abutment 58 can not pass between the reel and the rod when they are assembled. The abutment 60 is formed by a thickened tongue-like body end region which is continuous with the body portion 54 at its end remote from the abutment 58. The abutment 60 is sufficiently thicker than the body portion that it can not pass between the reel and the rod when they are assembled. The body 18 of FIGS. 1 and 2 is designed that it may be molded or extruded with a single material forming the body portion and the abutments.

The end structure 57 enables the body 18 to be detachably secured to the connecting structure 19. As shown by FIGS. 1 and 2 the end structure 57 is provided by a projecting section of the thickened body end region forming the abutment 60. The end structure 57 thus projects from the abutment 60 and defines an eye 62 extending through the thickened end region. The thickened body end region serves to reinforce the eye 62. Thus when the connecting structure 19 is attached to the body 18 and is tensioned, the material surrounding the eye 62 strongly resists tearing or stretching.

The connecting structure 19 comprises a tether 64 having releasable spring-clip connectors 66 attached at its opposite ends. The illustrated tether is a thin braided or stranded stainless metal cable which is light and limply flexible. Each end of the cable is formed into a loop and fixed with a crimped metal collar 67. Each loop is linked to a respective connector 66. One connector is run through the eye 62 and clipped in place. The connector at the opposite tether end is attached to a person, boat or other suitable object. The connectors 66 are illustrated as being of a conventional well known type of construction and are therefore not described in detail. The connectors can be of any suitable type so long as they are quickly and easily detachable.

As illustrated by FIGS. 1 and 2 the body 18 is disposed between the rod and reel with the abutment 58 engaged with the rod and reel shoe and the body portion 54 projecting from the rod and reel assembly to position the end structure 57 remote from the assembly. The body portion is sufficiently stiff that the tether is maintained a maximum distance from the rod and reel assembly so that interference with the tether during fishing is avoided.

The connectors are selected so that they can be attached and detached from the anchor body quite easily if desired. Typically the anchor body is attached to the tether when the rod and reel are unattended. Should a fish get on the line the connector construction permits detachment of the tether unless the fish is quite heavy and active. In the latter case the anchor body construction minimizes possible interference between the tether and the rod and reel during play of the fish.

Figure 3:
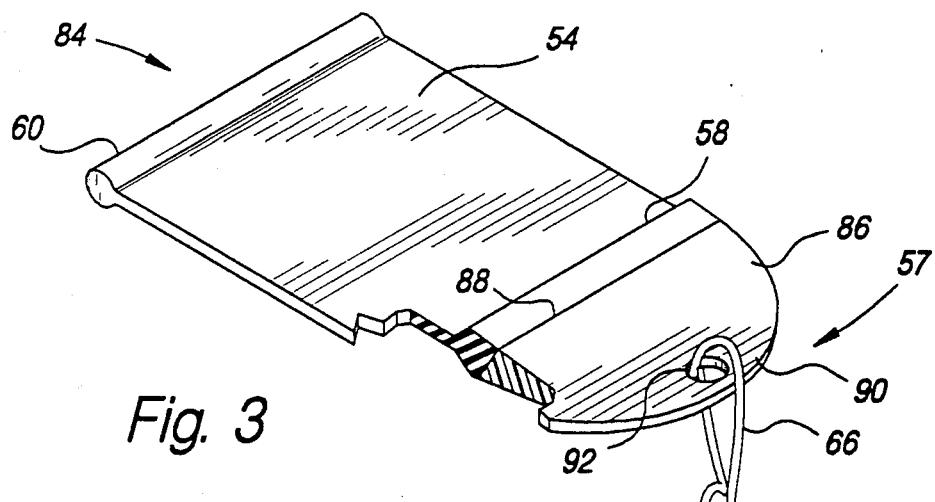
FIG. 3 is a perspective view of an anchor body constructed according to an alternative embodiment of the present invention.

FIG. 3 illustrates an alternative construction of a loss preventive anchor constructed according to the invention. The alternative anchor 84 is similar to the anchor 18 of FIGS. 1 and 2 and identical parts are indicated by corresponding reference characters.

The anchor 84 is formed by a body portion 54 and abutments 58,60 substantially like those described in reference to FIGS. 1 and 2. The end structure 57 is modified in that it is formed by a tongue 86 which is fixed to the abutment 60 along its base 88 and projects from the abutment 60 in a direction parallel to the direction of extent of the body portion 54. The tongue base 88 is thickened and is flush with the thickened abutment 60 at their juncture. The illustrated tongue 86 is tapered so that its thickness is reduced proceeding toward the rounded projecting end 90. The tongue 86 is formed from a relatively high strength material, stronger than the body portion 54, and a tether connecting eye 92 is formed in the end 90. The body portion 54 and the abutments are preferably formed by a relatively stiff rubber-like material which is compatible with the tongue material. The tongue and body portion can be bonded together by any suitable substance or process or they can be mechanically coupled together if convenient. The tongue can thus be formed by any suitable plastic or even a metallic material. The composite anchor provides an extended tether connecting end structure 57 which supports the tether even farther away from the rod and reel than the anchor 18 of FIGS. 1 and 2. The tongue 86 strongly resists deformation of the eye 92 by the tether spring clip 66 even though the tongue is quite thin.

Figure 4:
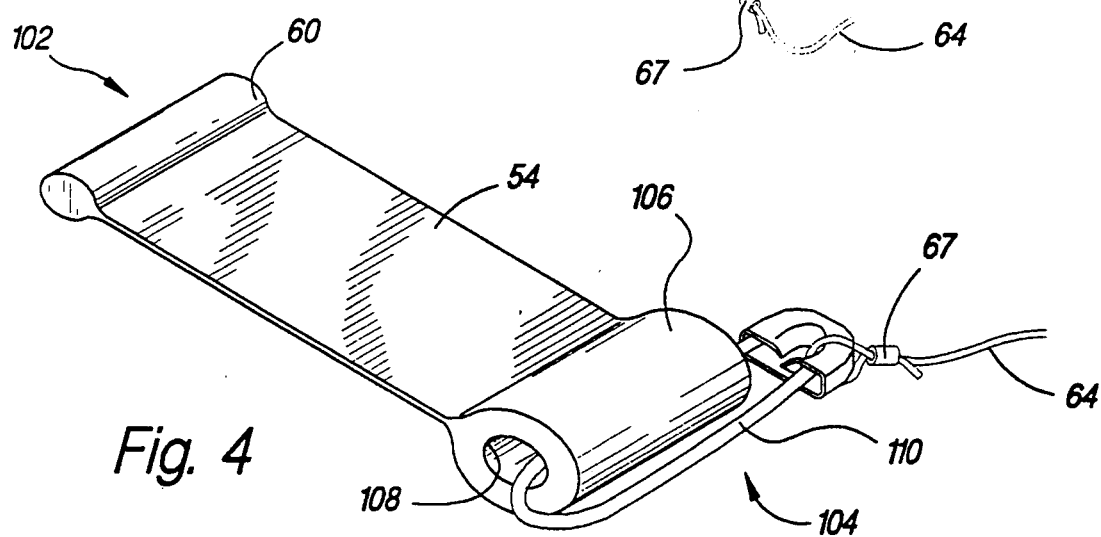
FIG. 4 is a perspective view of another alternative anchor body constructed in accordance with the invention.

FIG. 4 illustrates another alternative loss preventive anchor indicated by the reference character 102 in which the abutment 60 and the end structure 57 of the anchor 18 (FIGS. 1 and 2) are replaced by a generally cylindrical end structure 104 forming an abutment section 106 adjacent the body portion 54 and a tether connecting eye 108 which extends axially through the end structure 104 substantially on the cylinder axis.

The anchor 102 is designed so that it can be produced from a plastic extrusion with the eye 108 formed by the extrusion process itself. In the FIG. 4 embodiment, the spring connector 110 is preferably a so-called "safety-pin"-type fastener having its spring leg extending through the eye 108. The construction of this kind of fastener is well known and the fastener 110 is therefore schematically illustrated and not described further.

Figure 5:
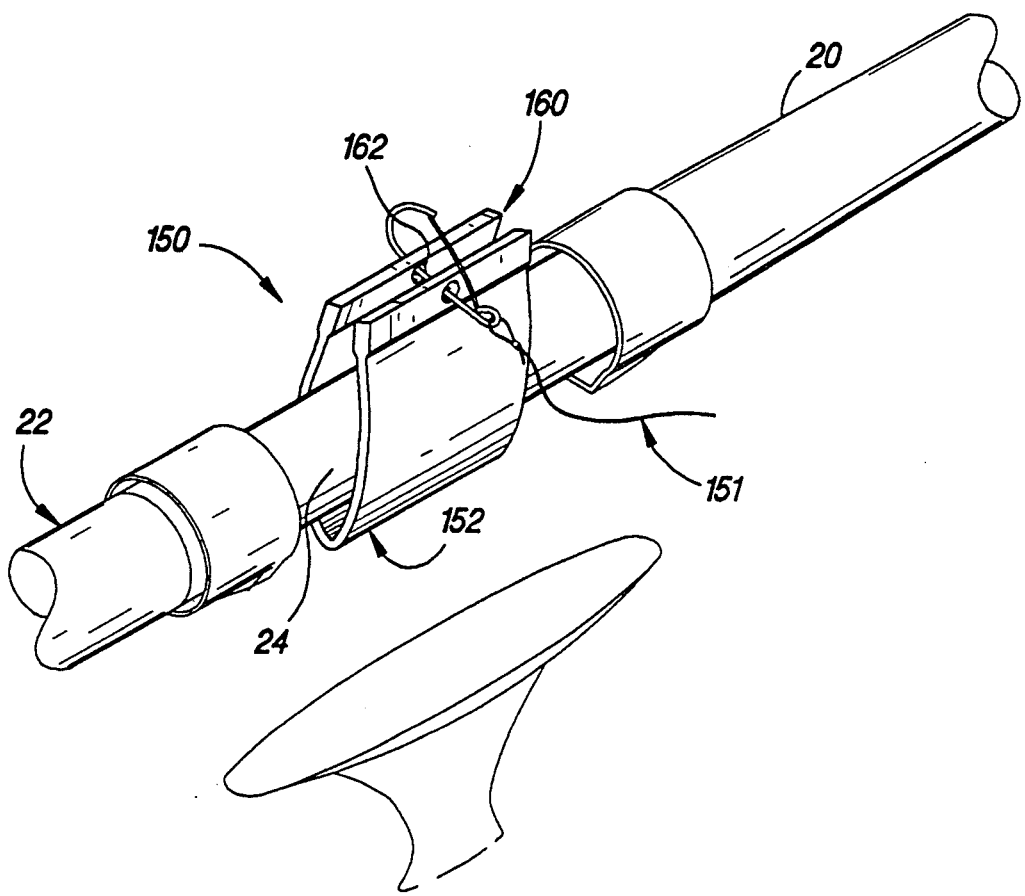
FIG. 5 is a fragmentary perspective view of a rod and reel being assembled with still another alternative embodiment of the anchor body.
Figure 6:
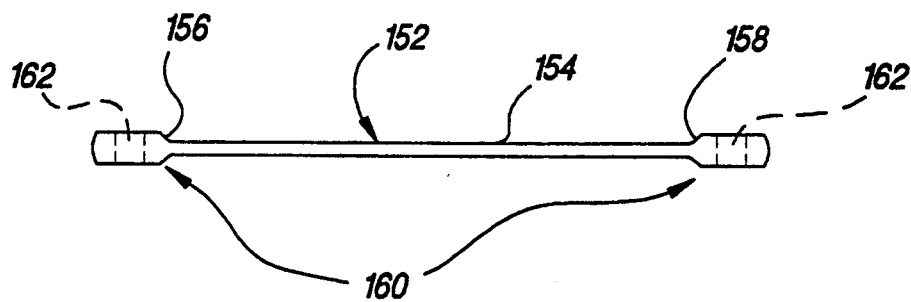
FIG. 6 is a elevational view of the anchor body of FIG. 5 prior to assembly.

FIGS. 5 and 6 show another anchor 150 constructed according to the invention. The anchor 150 comprises connecting structure 151 in the form of a tether with end connectors and an anchor body 152 mounted between the rod and reel. The body 152 comprises a body portion 154 between the rod and the reel, abutments 156, 158, respectively disposed at opposite ends of the body portion, and end structure 160 for connecting the body to the tether.

The body portion 154 is preferably formed by an elongated, thin generally rectangular strip of resilient rubber-like material which is wrapped around the rod at the mounting location. The reel is mounted to the rod thus securing the anchor body to the assembly. The body portion 154 is sufficiently thin that the reel is easily mounted to the rod. The body portion 154 is also resilient so that it may be compressed between the rod and reel; but it is not absolutely essential that such compression occur.

The abutments 156, 158 prevent the anchor body from being removed from the assembled rod and reel. Each abutment is formed by a thickened end region of the body 152. Each abutment is sufficiently thicker than the body portion 154 that neither can pass between the rod and reel when they are assembled.

The end structure 160 provides for connection of the tether to both ends of the anchor body 152. The illustrated end structure is formed by identical thickened end regions projecting beyond the abutments 156, 158. An eye 162 extends through each respective end region with the eyes located so that they are aligned when the anchor body is wrapped around the rod. The eyes receive a tether connecting spring clip by which the rod and reel assembly is secured against loss. In the illustrated embodiment the anchor body portion 154 is lightly compressed and frictionally engaged between the rod and reel so the end structure 160 remains in the illustrated position during use with the tether connected to the rod on the side opposite from the reel. The anchor body thus maintains the tether positioned remote from the reel to reduce the possibility of the tether interfering with operation of the reel.

While different embodiments of the invention have been illustrated and described in detail, the present invention is not to be considered limited to the precise constructions disclosed. Various adaptations, modifications and uses of the invention may occur to those having ordinary skill in the art to which the invention relates. The intention is to cover hereby all such adaptations, modifications and uses which fall within the spirit or scope of the appended claims.

Having described my invention I claim:

1. A fishing rod and reel assembly comprising a rod having a reel mounting location, a reel comprising a reel mounting shoe detachably secured to said reel mounting location, and a fishing equipment loss preventive anchor, the anchor comprising:
   a) a body secured to said assembly, said body comprising a body portion extending between said reel mounting location and said mounting shoe;
   b) connecting means connected to said body for securing said anchor and preventing loss of said assembly; and,
   c) wherein said body portion comprises a thin elongated strip of stiffly resilient material and movement limiting structure for engaging said assembly and maintaining said body portion positioned between said reel and said rod when the body portion might otherwise be dislodged, said movement limiting structure comprising first and second abutments disposed at opposite ends of said body portion, said abutments being thicker than said body portion and projecting therefrom for engagement with said assembly.

2. A fishing rod and reel assembly comprising a rod having a reel mounting location, a reel comprising a reel mounting shoe detachably secured to said reel mounting location, and a fishing equipment loss preventive anchor, the anchor comprising:
   a) a body secured to said assembly, said body comprising a body portion extending between said reel mounting location and said mounting shoe and end structure by which said body and a connector element are joined, said end structure comprising a connector element receiving eye formed in said body and a second connector element receiving eye, said first and second eyes disposed at opposite ends of said body portion, said body portion extending around said rod from said mounting location with said eyes aligned for reception of a connecting element; and
   b) connecting means connected to said body for securing said anchor and preventing loss of said assembly comprising a tether and a detachable connector element securing said tether to said body, 3. A fishing rod and reel assembly comprising a rod having a reel mounting location, a reel comprising a reel mounting shoe detachably secured to said reel mounting location, and a fishing equipment loss preventive anchor, the anchor comprising:
   a) a body secured to said assembly, said body comprising a body portion extending between said reel mounting location and said mounting shoe, said body projecting from between said rod and reel to a remote projecting end structure;
   b) connecting means connected to said body for securing said anchor and preventing loss of said assembly comprising a tether and a detachable connector element securing said tether to said body, said tether and connector element being attached to said remote end structure to minimize possible interference between said tether and said assembly; and, c) wherein said body is a composite of two materials, said body portion formed from a relatively resilient stiff material and said end structure formed from a material which is stronger than the body portion material, said end structure and said body portion are permanently affixed.

4. A fishing rod and reel assembly comprising a rod having a reel mounting location, a reel comprising a reel mounting show detachably secured to said reel mounting location, and a fishing equipment loss preventive anchor, the anchor comprising:

a) a body secured to said assembly, said body comprising a body portion extending between said reel mounting location and said mounting shoe, said body projecting from between said rod and reel to a remote projecting end structure;

b) connecting means connected to said body for securing said anchor and preventing loss of said assembly comprising a tether and a detachable connector element securing said tether to said body, said tether and connector element being attached to said remote end structure to minimize possible interference between said tether and said assembly; and, c) said body further comprising movement limiting structure comprising first and second abutments disposed at opposite ends of said body portion, said abutments being thicker than said body portion and projecting therefrom for engagement with said assembly, said end structure being formed continuously with at least one of said abutments.

5. The fishing rod and reel assembly of claim 4 wherein said first and second abutments are defined by cylindrically curved walls merging with said body portion at opposite ends thereof.

6. The fishing rod and reel assembly of claim 5 wherein said end structure is defined by a cylindrical enlarged end of said body, said cylindrical end defining an eye extending therethrough in the direction of the cylinder axis.

7. A loss preventive anchor for a fishing rod and fishing reel detachably secured together to form an assembly, said anchor comprising:

a) a body secured to said assembly, said body comprising an elongated body portion disposed between said rod and said reel and extending therefrom;

b) connecting means connected to said body to secure the assembly against loss;

c) said body further comprising movement limiting structure for engaging said assembly and maintaining said body portion positioned between said reel and said rod when the body portion might otherwise be dislodged, said movement limiting structure comprising first and second abutments projecting from said body and disposed for engagement with respective portions of said assembly.

8. A loss preventive anchor for a fishing rod and fishing reel detachably secured together to form an assembly, said anchor comprising:

a) a body secured to said assembly, said body comprising an elongated body portion disposed between said rod and said reel and extending therefrom and end structure attached to said body portion and by which a connecting means is secured to said body, said end structure comprising a connecting means receiving eye formed in said body;

b) connecting means connected to said body to secure the assembly against loss;

c) said end structure formed at least in part by an elongated enlarged end of said anchor body extending transverse to the direction of extent of said body portion, said connecting means receiving eye extending through said enlarged end in its direction of extent.

* * * * *